US012481102B2

(12) United States Patent
Hua et al.

(10) Patent No.: US 12,481,102 B2
(45) Date of Patent: Nov. 25, 2025

(54) COMMUNICATION MODULE FOR A SYSTEM FOR TRANSFERRING DATA BY LIGHT BEAMS AND SYSTEM FOR TRANSFERRING DATA BY LIGHT BEAMS

(71) Applicant: SEW-EURODRIVE GMBH & CO. KG, Bruchsal (DE)

(72) Inventors: Zhidong Hua, Bruchsal (DE); Thomas Schäfer, Karlsdorf-Neuthard (DE); Andreas Wanjek, Waghäusel (DE); Michael Ermert, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 234 days.

(21) Appl. No.: 18/279,909

(22) PCT Filed: Feb. 7, 2022

(86) PCT No.: PCT/EP2022/052901
§ 371 (c)(1),
(2) Date: Sep. 1, 2023

(87) PCT Pub. No.: WO2022/184382
PCT Pub. Date: Sep. 9, 2022

(65) Prior Publication Data
US 2024/0142708 A1 May 2, 2024

(30) Foreign Application Priority Data
Mar. 2, 2021 (DE) .......................... 102021001119.8

(51) Int. Cl.
*G02B 6/35* (2006.01)
*G02B 6/42* (2006.01)
*H04B 10/112* (2013.01)

(52) U.S. Cl.
CPC ......... *G02B 6/3512* (2013.01); *G02B 6/4214* (2013.01); *H04B 10/112* (2013.01)

(58) Field of Classification Search
CPC ... G02B 6/3512; G02B 6/4214; H04B 10/112
See application file for complete search history.

(56) References Cited

U.S. PATENT DOCUMENTS 6,453,083 B1 * 9/2002 Husain ................. G02B 26/085
385/20
6,701,036 B2 * 3/2004 Castracane ........ H04Q 11/0005
385/16

(Continued)

FOREIGN PATENT DOCUMENTS

DE 102008064652 A1 3/2011
DE 102012025281 A1 6/2014

(Continued)

OTHER PUBLICATIONS

International Search Report issued in corresponding International Application No. PCT/EP2022/052901 dated Jun. 21, 2022, pp. 1-2, English Translation.

*Primary Examiner* — Daniel Petkovsek
(74) *Attorney, Agent, or Firm* — Carter, DeLuca & Farrell LLP

(57) ABSTRACT

A communication module for a system for transferring data by light beams includes a transmitter for emitting a light beam in which data to be transferred are encoded, and a receiver for receiving a light beam. The transmitter includes a light source, and the receiver includes a light sensor. The transmitter and receiver are disposed offset from each other in a vertical direction. The transmitter emits a light beam in a longitudinal direction. The receiver has a mirror, which can be pivoted about a pivot axis extending in the vertical direction between a folded-out position and a folded-in position. The mirror is disposed such that a light beam (Continued)

incident from the longitudinal direction is deflected toward the light sensor by the mirror in the folded-out position. A system for transferring data by light beams includes at least one first communication module and at least one second communication module.

21 Claims, 6 Drawing Sheets

(56) References Cited

U.S. PATENT DOCUMENTS

| | | | |
|---|---|---|---|
| 8,175,428 B2 * | 5/2012 | Whitty | G02B 6/3512 385/24 |
| 9,618,622 B2 | 4/2017 | Geiger | |
| 10,931,373 B2 | 2/2021 | Maierbacher | |
| 11,863,234 B2 * | 1/2024 | Kirrbach | H04B 10/803 |
| 2005/0013616 A1 | 1/2005 | Yen | |
| 2006/0215954 A1 * | 9/2006 | Jenkins | G02B 6/3596 385/18 |
| 2020/0379091 A1 | 12/2020 | Hasselbach | |
| 2022/0094436 A1 | 3/2022 | Kirrbach | |
| 2022/0155424 A1 | 5/2022 | Neustadt | |

FOREIGN PATENT DOCUMENTS

| | | |
|---|---|---|
| DE | 102017209103 A1 | 12/2018 |
| DE | 102019205243 A1 | 10/2020 |
| DE | 102019207867 A1 | 12/2020 |
| DE | 102019208061 A1 | 12/2020 |
| DE | 102019218745 A1 | 6/2021 |
| WO | 2013045699 A1 | 4/2013 |
| WO | 2020245049 A2 | 12/2020 |

* cited by examiner

COMMUNICATION MODULE FOR A SYSTEM FOR TRANSFERRING DATA BY LIGHT BEAMS AND SYSTEM FOR TRANSFERRING DATA BY LIGHT BEAMS

FIELD OF THE INVENTION

The present invention relates to a communication module for a system for transferring data by light beams, which includes, for example, a transmitter for emitting a light beam in which data to be transferred are encoded, and a receiver for receiving a light beam. The present invention also relates to a system for transferring data by light beams, which includes, for example, at least two communication modules as described herein.

BACKGROUND INFORMATION

A system and a method for determining the position of a vehicle within a plant are described in German Patent Document No. 10 2016 010 999. The system has a vehicle with a receiver module and a stationary transmitter module. The transmitter module has a light source and emits linearly polarized light. The receiver module has a light sensor.

A system and a method for data transfer by visible light are described in German Patent Document No. 10 2018 006 988. The system has a receiver with an image sensor whose light-sensitive surface is scanned line by line, and a transmitter with a controllable illuminant that emits modulated light.

A system for data transfer and position determination is described in European Patent Document No. 3 403 055, which includes two parts that can be moved relative to one another. The first part has a light guide emitting light laterally and a controllable light source, and the second part has at least one sensor arrangement for detecting the light intensity.

A wireless communication network is described in PCT Patent Document No. WO 2020/245049, which includes a base station and movably disposed subscriber devices.

German Patent Document No. 10 2019 205 243 describes a LIDAR sensor for optically capturing a field of view, which sensor has a transmitter unit, a deflection unit, and a receiver unit.

German Patent Document No. 10 2019 218 745 describes a LIDAR arrangement that includes a stator, a rotor, and a communication device for bidirectional data transmission.

An optical sensor for spatial scanning with few moving parts supported exclusively by spring elements is described in German Patent Document No. 10 2008 064 652.

German Patent Document No. 10 2012 025 281 describes an optical object detection device for a motor vehicle, which device includes a transmitter unit, a receiver unit, and an evaluation unit.

German Patent Document No. 10 2019 207 867 describes an optical arrangement for a LIDAR device, which arrangement has a lens array and a lens.

SUMMARY

Example embodiment of the present invention provide a communication module for a system for transferring data by light beams and a system for transferring data by light beams.

According to example embodiments, a communication module for a system for transferring data by light beams includes a transmitter for emitting a light beam in which data to be transferred are encoded, and a receiver for receiving a light beam. The transmitter has a light source, and the receiver has a light sensor. The transmitter and receiver are disposed offset from each other in a vertical direction, and the transmitter emits a light beam in a longitudinal direction. The receiver has a mirror that can be pivoted about a pivot axis extending in the vertical direction between a folded-out position and a folded-in position. The mirror is disposed such that a light beam incident from the longitudinal direction is deflected toward the light sensor by the mirror in the folded-out position. The longitudinal direction extends perpendicular to the vertical direction. A transverse direction extends perpendicular to the longitudinal direction and perpendicular to the vertical direction.

With a communication module described herein, duplex communication with another communication module is possible. If the communication modules involved are disposed appropriately, the light beams emitted by the transmitter of one communication module can be guided almost completely onto the receiver of the other communication module. Thus, even with a relatively small transmitting power, communication over a large distance is possible. If the vertical direction is perpendicular to a ground, the mirror surface and the emitter and receiver exit and entry surfaces are also aligned perpendicular to the ground, reducing the amount of dirt and dust deposited on these surfaces.

According to example embodiments, the mirror is disposed such that a light beam incident from the longitudinal direction is deflected into the transverse direction by the mirror in the folded-out position. In the folded-out position, the mirror is thus inclined by about 45° to the longitudinal direction and by about 45° to the transverse direction.

According to example embodiments, the receiver has a spring which pivots the mirror about the pivot axis to the folded-out position. Thus, the mirror is automatically moved to the folded-out position when no external force is applied to the mirror.

According to example embodiments, the receiver has an optical element, e.g., a lens or lens system, which focuses a light beam deflected by the mirror onto the light sensor. This, for example, increases the intensity of the light incident on the light sensor.

According to example embodiments, the transmitter has a contact surface which is inclined to the longitudinal direction and inclined to a transverse direction. The contact surface is used to pivot the mirror of another communication module from the folded-out position and into the folded-in position, thereby allowing two communication modules to move past each other.

According to example embodiments, the transmitter has a collimator which parallelizes strongly divergent light generated by the light source into a light beam. The light beam generated in this manner impinges precisely on the receiver of another communication module. With a larger diameter of the collimated light beam, the irradiance can be reduced while maintaining the same light output, thus increasing the safety of the system. If the light beam is made slightly divergent, the system is more tolerant to angular errors of the transmitter. However, in this case the maximum range decreases.

According to example embodiments, a system for transferring data by light beams includes at least one first communication module as described herein, and at least one second communication module as described herein. The communication modules are disposed such that when the mirrors are in the folded-out position, a light beam emitted by the transmitter of the first communication module is deflected onto the light sensor of the second communication module, and a light beam emitted by the transmitter of the second communication module is deflected onto the light sensor of the first communication module.

The system allows full-duplex communication between two communication modules by transferring data by light beams.

According to example embodiments, the communication modules are disposed such that the transmitter of the first communication module is vertically aligned with the mirror of the second communication module, and such that the transmitter of the second communication module is vertically aligned with the mirror of the first communication module. The light beams emitted by the transmitters of the communication modules extend parallel to one another.

According to example embodiments, the first communication module and the second communication module are movable relative to each other in a longitudinal direction and are disposed offset from each other in a transverse direction. The system is suitable for communication between moving vehicles and a fixed station in a transport system, for example.

According to example embodiments, the first communication module and the second communication module are disposed offset from each other in the transverse direction such that when the communication modules move past each other in the longitudinal direction, a contact surface of the transmitter of the first communication module pivots the mirror of the receiver of the second communication module into the folded-in position, and a contact surface of the transmitter of the second communication module pivots the mirror of the receiver of the first communication module into the folded-in position. This allows two communication modules to move past each other.

Further features and aspects of example embodiments of the present invention are explained in more detail with reference to the appended schematic Figures.

DETAILED DESCRIPTION

Figure 1:
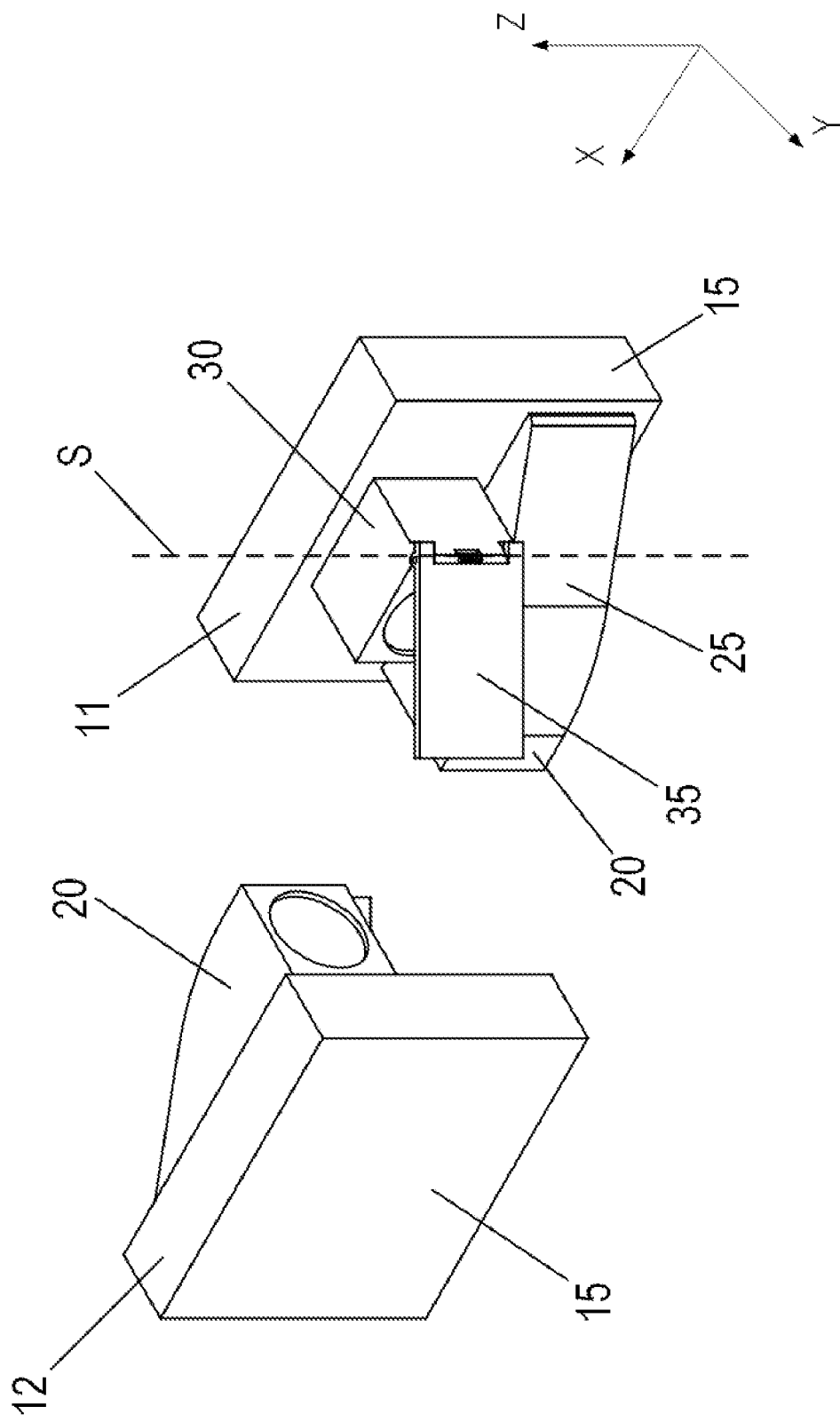
FIG. 1 is a perspective view of a system for transferring data.

FIG. 1 is a perspective view of a system for transferring data by light beams 40. The system includes a first communication module 11 and a second communication module 12, which are arranged in the same or similar manner. For example, data are transferable by light beams 40 from the first communication module 11 to the second communication module 12, as well as from the second communication module 12 to the first communication module 11.

Each of the communication modules 11, 12 includes a transmitter 20 for emitting a light beam 40 and a receiver 30 for receiving a light beam 40. In such a light beam 40, the data to be transferred are encoded. Each of the communication modules 11, 12 includes a holder 15 to which the transmitter and the receiver 30 are attached.

The first communication module 11 and the second communication module 12 are disposed in a transverse direction Y offset from each other. The first communication module 11 and the second communication module 12 are movable relative to each other in a longitudinal direction X. The transverse direction Y extends perpendicular to the longitudinal direction X. The transverse direction X and the longitudinal direction X extend perpendicular to a vertical direction Z.

The transmitter 20 and receiver 30 of a communication module 11, 12 are disposed offset from each other in the vertical direction Z. The receiver 30 has a mirror 35 that can be pivoted about a pivot axis S extending in the vertical direction Z between a folded-out position and a folded-in position. As illustrated, the mirror 35 is in the folded-out position. In the folded-out position, the mirror 35 is inclined by about 45° to the longitudinal direction X and by about 45° to the transverse direction Y.

The communication modules 11, 12 are disposed such that the transmitter 20 of the first communication module 11 is aligned in the vertical direction Z with the mirror 35 of the second communication module 12, and such that the transmitter 20 of the second communication module 12 is aligned in the vertical direction Z with the mirror 35 of the first communication module 11.

The transmitter 20 of a communication module 11, 12 has a contact surface 25. The contact surface 25 is inclined to the longitudinal direction X and inclined to a transverse direction Y. The contact surface 25 serves to pivot the mirror 35 of another communication module 11, 12 from the folded-out position and into the folded-in position.

Figure 2:
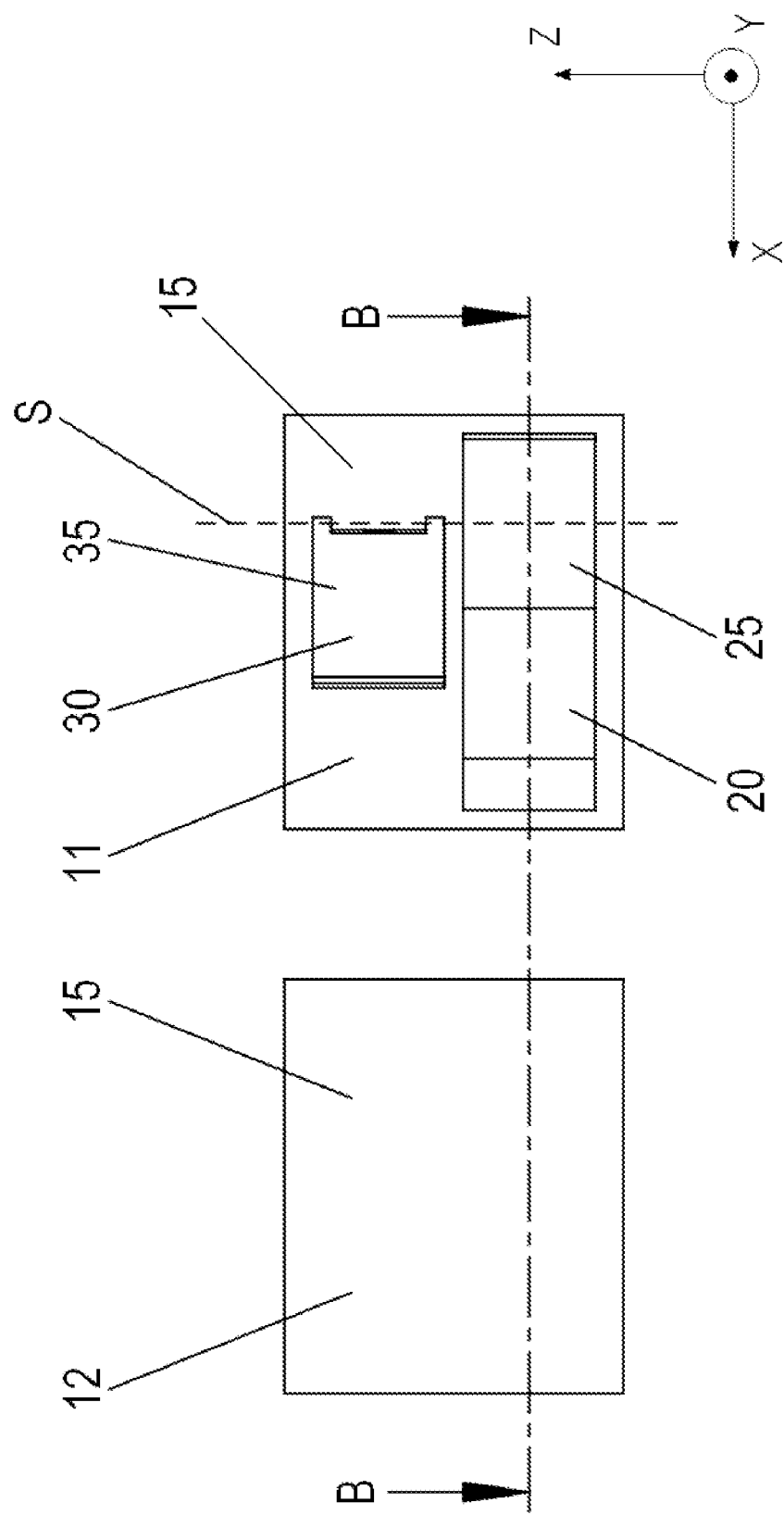
FIG. 2 is a front view of the system for transferring data.

FIG. 2 is a front view of the system for transferring data illustrated in FIG. 1. As mentioned above, the first communication module 11 and the second communication module 12 are movable relative to each other in the longitudinal direction X. As illustrated, the first communication module 11 is offset from the second communication module 12 in the longitudinal direction X.

The receiver 30 of a communication module 11, 12 has a spring. The spring serves to pivot the mirror 35 of the receiver 30 about the pivot axis S from the folded-out position into the folded-in position.

Figure 3:
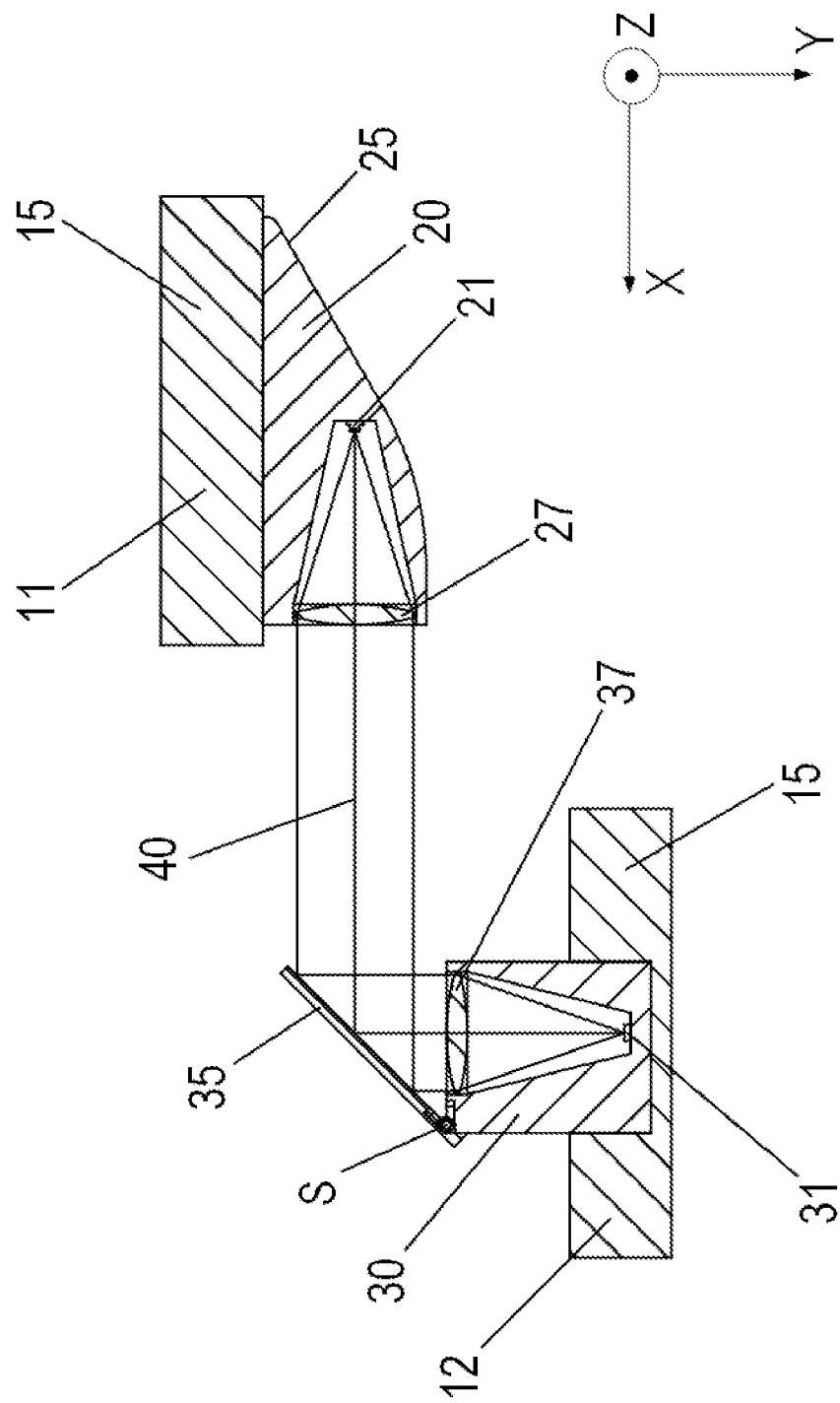
FIG. 3 is a cross-sectional view of the system for transferring data.

FIG. 3 is a cross-sectional view of the system for transferring data along the line of intersection B-B illustrated in FIG. 2. The transmitters 20 of the communication modules 11, 12 each emit a light beam 40 in the longitudinal direction X. The light beam 40 emitted by the transmitter 20 of the first communication module 11 impinges on the mirror 35 of the second communication module 12. The light beam 40 emitted by the transmitter 20 of the second communication module 12 impinges on the mirror 35 of the first communication module 11.

The transmitter 20 of a communication module 11, 12 has a light source 21, which is arranged, for example, in the form of a LASER diode. The transmitter 20 also has a collimator 27 which parallelizes strongly divergent light generated by the light source 21 into a light beam 40. The receiver 30 of a communication module 11, 12 has a light sensor 31, which is arranged, for example, in the form of a photodiode.

The mirror 35 of the receiver 30 is disposed such that a light beam 40 incident from the longitudinal direction X is deflected into the transverse direction Y and thus onto the light sensor 31 by the mirror 35 in the folded-out position. The receiver 30 also has an optical element 37, e.g., a lens or lens system, which focuses a light beam 40 deflected by the mirror 35 onto the light sensor 31.

For example, the communication modules 11, 12 are disposed such that when the mirrors 35 are in the folded-out position, the light beam 40 emitted by the transmitter 20 of the first communication module 11 is deflected onto the light sensor 31 of the second communication module 12, and the light beam 40 emitted by the transmitter 20 of the second communication module 12 is deflected onto the light sensor 31 of the first communication module 11.

Figure 4:
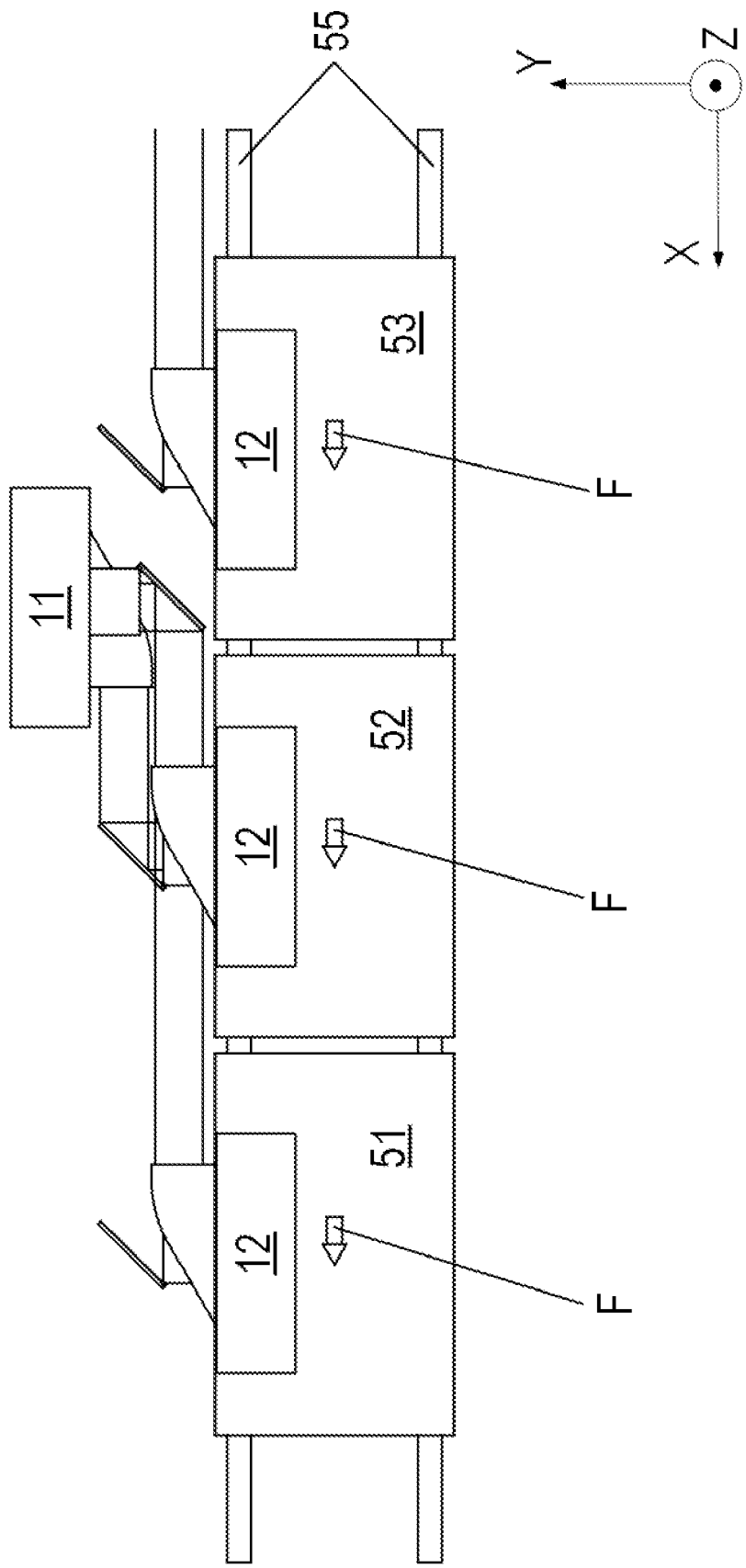
FIG. 4 illustrates a transport system with a system for transferring data.

FIG. 4 illustrates a transport system with a system for transferring data. The transport system includes a plurality of rail-mounted vehicles 51, 52, 53, which are movable in the longitudinal direction X on guide rails 55. A direction of travel F of the vehicles 51, 52, 53 is indicated by corresponding arrows. The transport system further includes a stationary first communication module 11, which is disposed fixedly with respect to the guide rails 55. Each of the vehicles 51, 52, 53 has a second communication module 12.

The second communication modules 12 are thus movable in the longitudinal direction X relative to the first communication module 11. As illustrated, data transfer by light beams 40 is possible between the stationary first communication module 11 and the second communication module 12 of the second vehicle 52. Data transfer by light beams 40 between the stationary first communication module 11 and the second communication modules 12 of the first vehicle 51 and the third vehicle 53 is not possible in the illustrated example embodiment.

Figure 5:
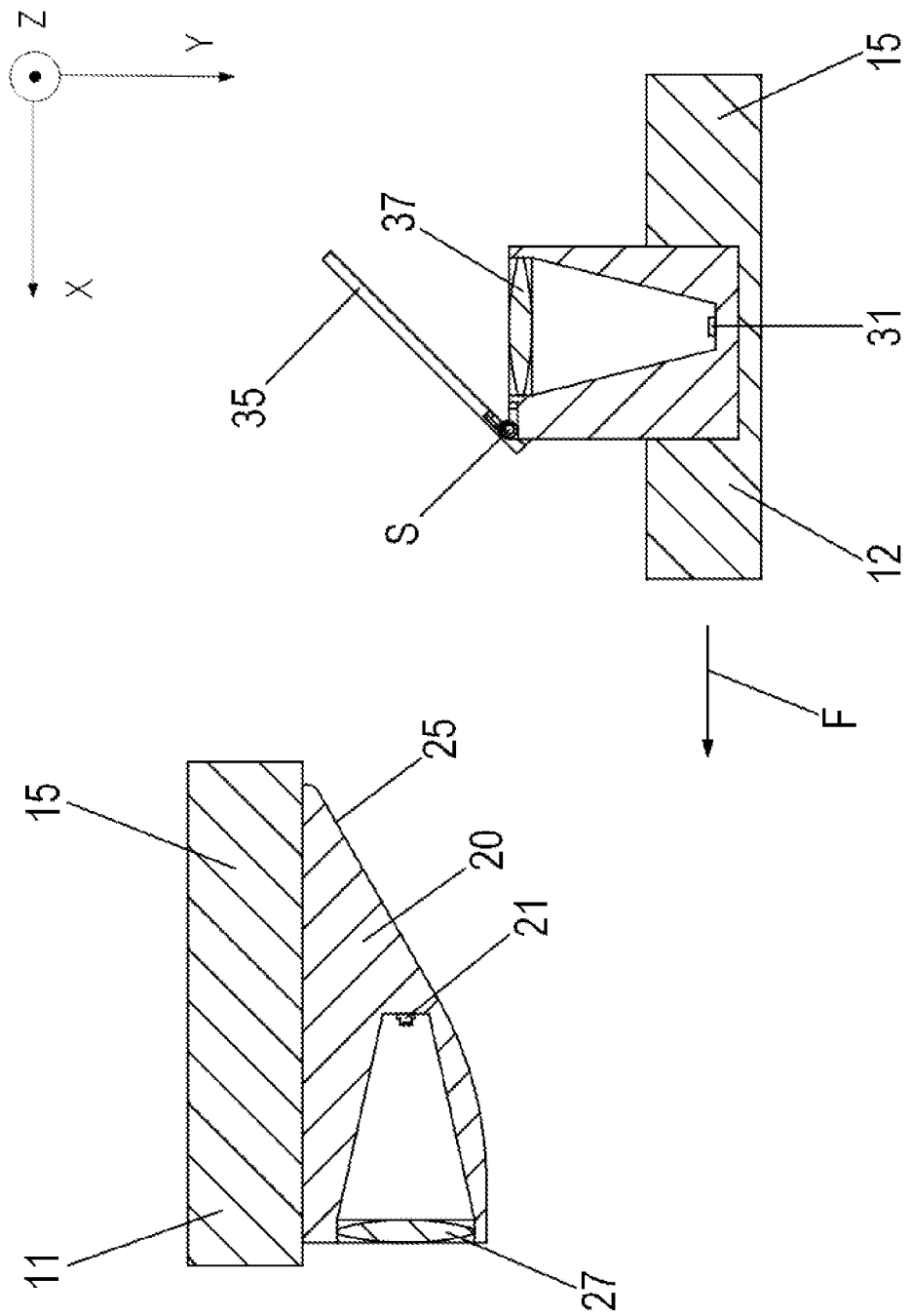
FIG. 5 is another cross-sectional view of the system for transferring data.

FIG. 5 is another cross-sectional view of the system for transferring data. The first communication module 11 is fixedly disposed, and the second communication module 12 thus moves relative to the first communication module 11 in a direction of travel F, which extends in the longitudinal direction X. For example, the second communication module 12 moves towards the first communication module 11. The mirrors of the communication modules 11, 12 are each in the folded-out position. Data transfer by light beams 40 between the stationary first communication module 11 and the second communication module 12 is not possible in the illustrated example embodiment due to the arrangement of the communication modules 11, 12 relative to one another.

If the second communication module 12 continues to move in the direction of travel F, the contact surface 25 of the transmitter 20 of the first communication module 11 comes into contact with the mirror 35 of the receiver 30 of the second communication module 12. Upon contact, the contact surface 25 of the first communication module 11 pivots the mirror 35 of the second communication module 12 from the folded-out position and into the folded-in position. At the same time, the contact surface 25 of the transmitter 20 of the second communication module 12 comes into contact with the mirror 35 of the receiver 30 of the first communication module 11. Upon contact, the contact surface 25 of the second communication module 12 pivots the mirror 35 of the first communication module 11 from the folded-out position and into the folded-in position.

Figure 6:
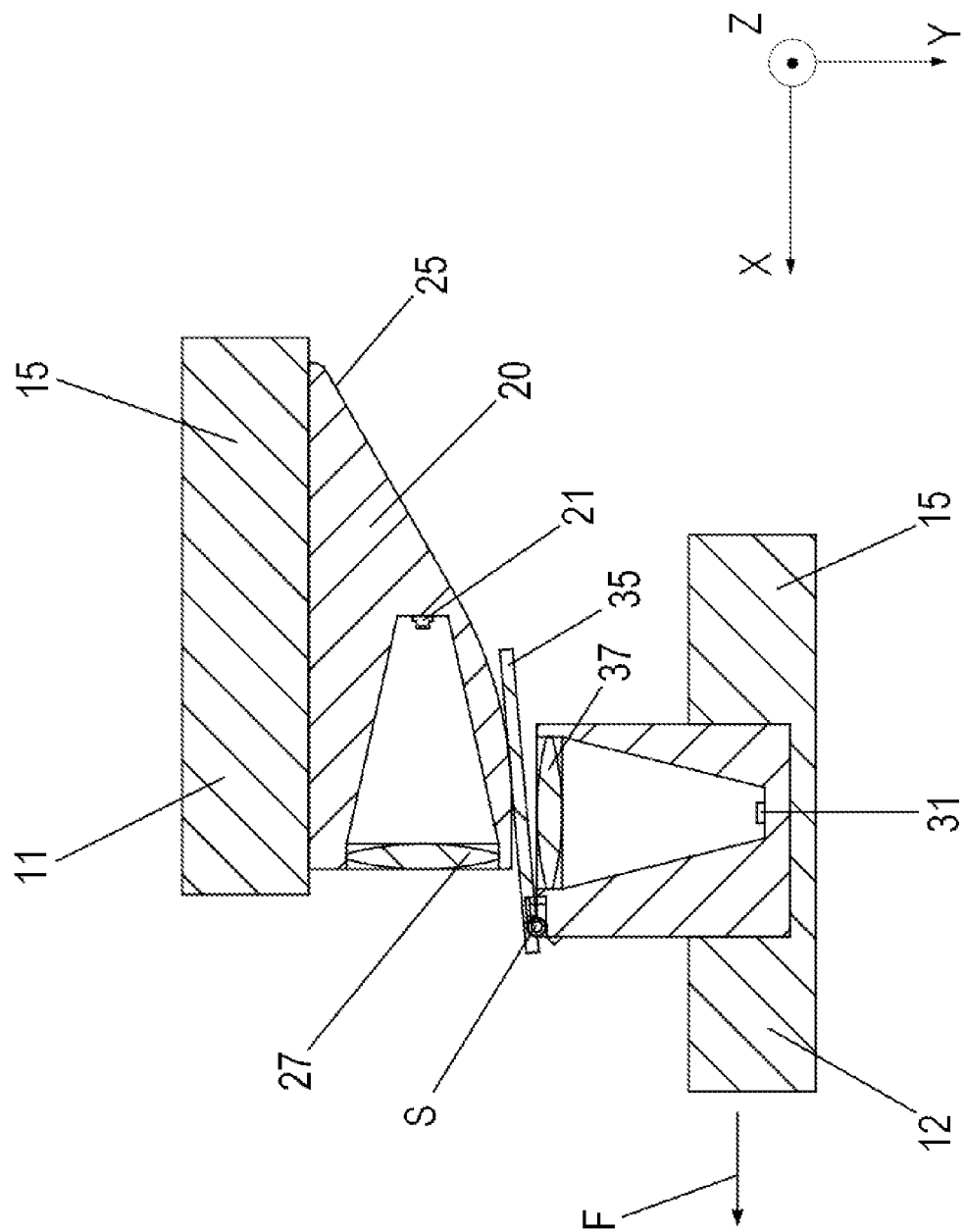
FIG. 6 is yet another cross-sectional view of the system for transferring data.

FIG. 6 is yet another cross-sectional view of the system for transferring data. Compared to FIG. 5, the first communication module 11 has moved further in the direction of travel F and is moving past the second communication module 12. The contact surface 25 of the first communication module 11 is in contact with the mirror 35 of the second communication module 12. The mirror 35 of the second communication module 12 is pivoted into the folded-in position. The contact surface 25 of the second communication module 12 is in contact with the mirror 35 of the first communication module 11. The mirror 35 of the first communication module 11 is pivoted into the folded-in position.

The first communication module 11 and the second communication module 12 are thus disposed offset from each other in the transverse direction Y such that when the communication modules 11,12 move past each other in the longitudinal direction X, the contact surface 25 of the transmitter 20 of the first communication module 11 pivots the mirror 35 of the receiver 30 of the second communication module 12 into the folded-in position, and the contact surface 25 of the transmitter 20 of the second communication module 12 pivots the mirror 35 of the receiver 30 of the first communication module 11 into the folded-in position. Data transfer by light beams 40 between the stationary first communication module 11 and the second communication module 12 is not possible in the illustrated example embodiment due to the arrangement of the communication modules 11, 12 relative to one another.

If the second communication module 12 continues to move further in the direction of travel F, the contact surface 25 of the first communication module 11 comes out of contact with the mirror 35 of the second communication module 12. In doing so, the spring of the receiver 30 pivots the mirror 35 of the second communication module 12 from the folded-in position into the folded-out position. At the same time, the contact surface 25 of the second communication module 12 comes out of contact with the mirror 35 of the first communication module 11. In doing so, the spring of the receiver 30 pivots the mirror 35 of the first communication module 11 from the folded-in position into the folded-out position.

The situation in which the contact surfaces 25 of the communication modules 11, 12 are out of contact with the mirrors 35 of the other communication module 11, 12 is illustrated in FIG. 3. In the illustrated example embodiment, data transfer by light beams 40 is possible between the stationary first communication module 11 and the second communication module 12.

LIST OF REFERENCE CHARACTERS

11 First communication module
12 Second communication module
15 Holder
20 Transmitter
21 Light source
25 Contact surface
27 Collimator
30 Receiver
31 Light sensor
35 Mirror
37 Optical element
40 Light beam
51 First vehicle
52 Second vehicle
53 Third vehicle
55 Guide rail
F Direction of travel
S Pivot pin
X Longitudinal direction
Y Transverse direction
Z Vertical direction

The invention claimed is:

1. A communication module for a system for transferring data by light beams, comprising:
   a transmitter including a light source and adapted to emit a first light beam having encoded data;

a receiver including a light sensor and adapted to receive a second light beam;

wherein the transmitter and the receiver are arranged offset from each other in a first direction;

wherein the transmitter is adapted to emit the first light beam in a second direction orthogonal to the first direction;

wherein the receiver includes a mirror pivotable about a pivot axis, extending in the first direction, between a folded-out position and a folded-in position;

wherein, in the folded-out position, the mirror is adapted to deflect the second light beam, incident from the second direction toward the light sensor; and wherein, in the folded-out position, the mirror is adapted to deflect the second light beam, incident from the second direction, into a third direction orthogonal to the first and second directions.

2. The communication module according to claim 1, wherein the transmitter includes a contact surface that is inclined to the second direction and inclined to a transverse direction transverse to the second direction, the contact surface adapted to pivot a mirror of a receiver of a second communication module in response to the communication modules moving past each other in the second direction.

3. The communication module according to claim 1, wherein the receiver includes a spring adapted to pivot the mirror about the pivot axis into the folded-out position.

4. The communication module according to claim 1, wherein the receiver includes an optical element, a lens, and/or a lens system adapted to focus the second light beam deflected by the mirror onto the light sensor.

5. The communication module according to claim 1, wherein the transmitter includes a contact surface that is inclined to the second direction and inclined to a transverse direction transverse to the second direction.

6. The communication module according to claim 1, wherein the transmitter includes a collimator adapted to collimate light generated by the light source into the first light beam.

7. The communication module according to claim 1, wherein the communication module is movable along the second direction.

8. The communication module according to claim 1, wherein the communication module is movable relative to a second communication module along the second direction.

9. The communication module according to claim 1, wherein the first direction is vertical.

10. The communication module according to claim 1, wherein the mirror is spring-biased to pivot the mirror about the pivot axis toward the folded-out position.

11. A system for transferring data by light beams, comprising:

at least one first communication module including:
a transmitter including a light source and adapted to emit a first light beam having encoded data;
a receiver including a light sensor and adapted to receive a second light beam;
wherein the transmitter and the receiver of the first communication module are arranged offset from each other in a first direction;
wherein the transmitter of the first communication module is adapted to emit the first light beam in a second direction orthogonal to the first direction;
wherein the receiver of the first communication module includes a mirror pivotable about a pivot axis, extending in the first direction, between a folded-out position and a folded-in position; and wherein, in the folded-out position, the mirror of the first communication module is adapted to deflect the second light beam, incident from the second direction toward the light sensor of the first communication module;

at least one second communication module including;
a transmitter including a light source and adapted to emit the second light beam having encoded data;
a receiver including a light sensor and adapted to receive the first light beam;
wherein the transmitter and the receiver of the second communication module are arranged offset from each other in the first direction;
wherein the transmitter of the second communication module is adapted to emit the second light beam in the second direction;
wherein the receiver of the second communication module includes a mirror pivotable about a pivot axis, extending in the first direction, between a folded-out position and a folded-in position; and
wherein, in the folded-out position, the mirror of the second communication module is adapted to deflect the first light beam, incident from the second direction toward the light sensor of the second communication module;

wherein the communication modules are configured such that, in the folded-out positions, the mirrors are adapted to deflect the first light beam, emitted by the transmitter of the first communication module, onto the light sensor of the second communication module, and to deflect the second light beam, emitted by the transmitter of the second communication module, onto the light sensor of the first communication module;

wherein a contact surface of the transmitter of the first communication module is adapted to pivot the mirror of the receiver of the second communication module into the folded-up position in response to the communication modules moving past each other in the second direction, and a contact surface of the transmitter of the second communication module is adapted to pivot the mirror of the receiver of the first communication module into the folded-up position in response to the communication modules moving past each other in the second direction.

12. The system according to claim 11, wherein the communication modules are arranged such that the transmitter of the first communication module is aligned in the first direction with the mirror of the second communication module, and the transmitter of the second communication module is aligned in the first direction with the mirror of the first communication module.

13. The system according to claim 11, wherein the first communication module and the second communication module are movable relative to each other in the second direction and are arranged offset from each other in a transverse direction transverse to the second direction.

14. The system according to claim 11, wherein, in the folded-out position, the mirror of the first communication module is adapted to deflect the second light beam, incident from the second direction, into a third direction orthogonal to the first and second directions, and/or, in the folded-out position, the mirror of the second communication module is adapted to deflect the first light beam, incident form the second direction, into the third direction.

15. The system according to claim 11, wherein the receiver of at least one of the communication modules includes a spring adapted to pivot the mirror about the pivot axis into the folded-out position.

16. The system according to claim 11, wherein the receiver of the first communication module includes an optical element, a lens, and/or a lens system adapted to focus the second light beam deflected by the mirror of the first communication module onto the light sensor of the first communication module, and/or the receiver of the second communication module includes an optical element, a lens, and/or a lens system adapted to focus the first light beam deflected by the mirror of the second communication module onto the light sensor of the second communication module.

17. The system according to claim 11, wherein the transmitter of at least one of the communication modules includes a contact surface that is inclined to the second direction and inclined to a transverse direction transverse to the second direction.

18. The system according to claim 11, wherein the transmitter of the first communication module includes a collimator adapted to collimate light generated by the light source of the first communication module into the first light beam, and/or the transmitter of the second communication module includes a collimator adapted to collimate light generated by the light source of the second communication module into the second light beam.

19. The system according to claim 11, wherein the first direction is vertical.

20. The system according to claim 11, wherein the mirror of at least one of the communication modules is spring-biased to pivot the mirror about the pivot axis toward the folded-out position.

21. A system, for transferring data by light beams, comprising:
at least one first communication module including:
    a transmitter including a light source and adapted to emit a first light beam having encoded data;
    a receiver including a light sensor and adapted to receive a second light beam;
    wherein the transmitter and the receiver of the first communication module are arranged offset from each other in a first direction;
    wherein the transmitter of the first communication module is adapted to emit the first light beam in a second direction orthogonal to the first direction;
    wherein the receiver of the first communication module includes a mirror pivotable about a pivot axis, extending in the first direction, between a folded-out position and a folded-in position; and
    wherein, in the folded-out position, the mirror of the first communication module is adapted to deflect the second light beam, incident from the second direction toward the light sensor of the first communication module;
at least one second communication module including:
    a transmitter including a light source and adapted to emit the second light beam having encoded data;
    a receiver including a light sensor and adapted to receive the first light beam;
    wherein the transmitter and the receiver of the second communication module are arranged offset from each other in the first direction;
    wherein the transmitter of the second communication module is adapted to emit the second light beam in the second direction;
    wherein the receiver of the second communication module includes a mirror pivotable about a pivot axis, extending in the first direction, between a folded-out position and a folded-in position; and
    wherein, in the folded-out position, the mirror of the second communication module is adapted to deflect the first light beam, incident from the second direction toward the light sensor of the second communication module;
wherein the communication modules are configured such that, in the folded-out positions, the mirrors are adapted to deflect the first light beam, emitted by the transmitter of the first communication module, onto the light sensor of the second communication module, and to deflect the second light beam, emitted by the transmitter of the second communication module, onto the light sensor of the first communication module;
wherein the first communication module and the second communication module are disposed offset from each other in a transverse direction transverse to the second direction, a contact surface of the transmitter of the first communication module adapted to pivot the mirror of the receiver of the second communication module into the folded-up position in response to the communication modules moving past each other in the second direction, a contact surface of the transmitter of the second communication module adapted to pivot the mirror of the receiver of the first communication module into the folded-up position in response to the communication modules moving past each other in the second direction.

\* \* \* \* \*